US012750669B2

(12) United States Patent
Chattopadhyay et al.

(10) Patent No.: US 12,750,669 B2
(45) Date of Patent: Sep. 29, 2026

(54) LOGICAL REPLICATION OF DATA ASSOCIATED WITH A CREDENTIAL IN A CELL-BASED AUTHORIZATION REQUEST PROCESSING SYSTEM

(71) Applicant: Capital One Services, LLC, McLean, VA (US)

(72) Inventors: Raja Chattopadhyay, Glen Allen, VA (US); Benjamin Christenson, Minneapolis, MN (US); Walker Sensabaugh, Henrico, VA (US); Robert C. Stettler, Powhatan, VA (US); Harold A. Sell, Glen Allen, VA (US); Senthil K. Suriyanarayanan, Glen Allen, VA (US); Rakesh Koul, Glen Allen, VA (US); Tyler O'Connell, Richmond, VA (US); Erin Kirby, Glen Allen, VA (US); William A. Biggins, Glen Allen, VA (US); Taimore Khan, Richmond, TX (US); Margaret Cook, Chicago, IL (US); Nicholas Maguire, Crozier, VA (US); Kyle Heide, Midlothian, VA (US); Krystle C. Voss, Richmond, VA (US); Anna Ross, Chicago, IL (US); Jason Baumgartner, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 21 days.

(21) Appl. No.: 19/061,619

(22) Filed: Feb. 24, 2025

(65) Prior Publication Data

US 2026/0255166 A1 Aug. 27, 2026

(51) Int. Cl.
*H04W 12/08* (2021.01)
*G06F 16/27* (2019.01)

(52) U.S. Cl.
CPC .......... *H04W 12/08* (2013.01); *G06F 16/273* (2019.01)

(58) Field of Classification Search
CPC ............................. H04W 12/08; G06F 16/273
See application file for complete search history.

(56) References Cited

U.S. PATENT DOCUMENTS

| | | | | |
|---|---|---|---|---|
| 11,023,887 | B2 * | 6/2021 | Moreton | G06Q 20/3672 |
| 2004/0133591 | A1 * | 7/2004 | Holenstein | G06F 11/2064 707/999.102 |
| 2010/0191884 | A1 * | 7/2010 | Holenstein | G06F 16/2343 707/613 |
| 2017/0031983 | A1 * | 2/2017 | Sarferaz | G06F 16/24535 |
| 2018/0300381 | A1 * | 10/2018 | Horowitz | G06F 16/258 |
| 2022/0343348 | A1 * | 10/2022 | Teo | G06F 16/9032 |

* cited by examiner

*Primary Examiner* — Chau Le
(74) *Attorney, Agent, or Firm* — Harrity & Harrity, LLP

(57) ABSTRACT

In some implementations, a device may obtain a request including transaction information, the request being associated with one or more credentials. The device may add, based on the transaction information, a record to an authorization data structure associated with the one or more credentials. The device may adjust, based on the transaction information, one or more sub-aggregate data structures associated with the one or more credentials. The device may provide change information to enable logical replication of the addition to the data structure and the adjustment of the one or more sub-aggregate data structures on one or more cells.

20 Claims, 5 Drawing Sheets

LOGICAL REPLICATION OF DATA ASSOCIATED WITH A CREDENTIAL IN A CELL-BASED AUTHORIZATION REQUEST PROCESSING SYSTEM

BACKGROUND

Logical replication is a technique of database replication according to which changes (e.g., insertions, updates, deletions, or the like) in one database (e.g., a publisher) are captured and replayed on another database (e.g., a subscriber) at a higher level of abstraction, such as at the row level or the statement level. Logical replication can provide flexibility and customization with respect to how data is transferred and replicated between systems.

SUMMARY

Some implementations described herein relate to a device for logical replication of data associated with a credential in a cell-based authorization request processing system. The device may include one or more memories and one or more processors communicatively coupled to the one or more memories. The one or more processors may be configured to obtain an authorization request including transaction information, the authorization request being associated with one or more credentials. The one or more processors may be configured to add, based on the transaction information, an authorization record to an authorization data structure associated with the one or more credentials. The one or more processors may be configured to adjust, based on the transaction information, one or more sub-aggregate data structures associated with the one or more credentials. The one or more processors may be configured to provide change information to enable logical replication of the addition to the authorization data structure and the adjustment of the one or more sub-aggregate data structures on one or more cells.

Some implementations described herein relate to a method for logical replication of data associated with a credential in a cell-based authorization request processing system. The method may include obtaining, by a device, a request including transaction information, the request being associated with one or more credentials. The method may include adding, by the device, based on the transaction information, a record to an authorization data structure associated with the one or more credentials. The method may include adjusting, by the device, based on the transaction information, one or more sub-aggregate data structures associated with the one or more credentials. The method may include providing, by the device, change information to enable logical replication of the addition to the data structure and the adjustment of the one or more sub-aggregate data structures on one or more cells.

Some implementations described herein relate to a non-transitory computer-readable medium that stores a set of instructions. The set of instructions, when executed by one or more processors of a device, may cause the device to obtain an authorization request including transaction information, the authorization request being associated with one or more credentials. The set of instructions, when executed by one or more processors of the device, may cause the device to update, based on the transaction information, an authorization record to an authorization data structure associated with the one or more credentials. The set of instructions, when executed by one or more processors of the device, may cause the device to modify, based on the transaction information, one or more sub-aggregate data structures associated with the one or more credentials. The set of instructions, when executed by one or more processors of the device, may cause the device to cause logical replication of the update to the authorization data structure and the modification of the one or more sub-aggregate data structures with respect to one or more cells.

DETAILED DESCRIPTION

Figure 1A:
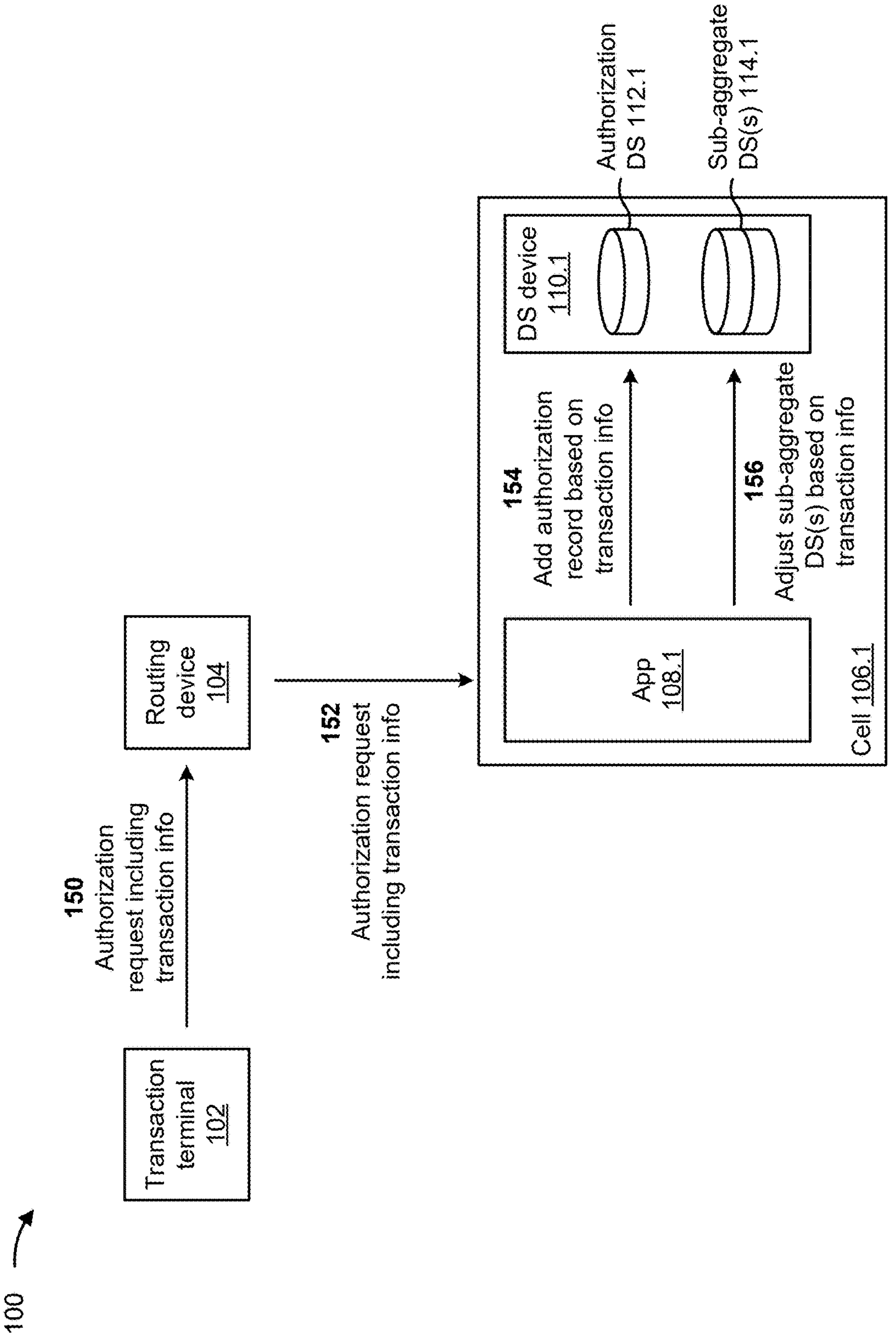
FIGS. 1A-1B are diagrams of an example associated with logical replication of data associated with a credential in a cell-based authorization request processing system, in accordance with some embodiments of the present disclosure.

The following detailed description of example implementations refers to the accompanying drawings. The same reference numbers in different drawings may identify the same or similar elements.

A user of a transaction medium (e.g., a transaction card) may attempt to perform a transaction using the transaction medium. Such a transaction needs to be authorized by an entity (e.g., a financial institution) that manages an account associated with the transaction medium. In general, authorization of a transaction may include verifying validity of the transaction, ensuring that the transaction medium is active, ensuring (e.g., using open-to-buy (OTB) calculation) that the account and/or transaction medium is within an applicable limit, ensuring that the transaction is free from fraud, or the like.

Conventionally, an entity relies on an external (e.g., third-party) system for batch processing of requests for authorizations associated with transactions. However, reliance on an external system is disadvantageous for a number of reasons. For example, innovation and adaptation with respect to evolving needs associated with authorization request processing is difficult or impossible because the entity does not have control of the processing system. Further, such systems conventionally use a batch-processing technique and are not scalable, meaning that low latency (e.g., during peak transaction periods) cannot be guaranteed. Additionally, such external systems are not capable of providing direct connections and deep data integration that could otherwise be used to strengthen fraud prevention capabilities. Further, the use of such an external system may have an undesirable monetary cost.

Further, conventional systems used for authorization request processing struggle to handle bulk and burst authorization volumes, which can lead to high latency (e.g., OTB calculations associated with bulk authorization events and burst transaction events can be complex and require reliable processing). It is challenging to implement a system that supports authorization request processing during both bulk authorization events (e.g., processing of a large quantity of authorization requests associated with a single account credential on a single day) and burst transaction events (e.g., a group of close-in-time or concurrent transactions associated with a single account credential), while also supporting authorization request processing for OTB validation for typical authorization request traffic and authorizations for clearing (e.g., via settlement or posting events).

Some implementations described herein provide techniques and apparatuses for logical replication of data associated with a credential in a cell-based authorization request processing system. In some implementations, a cell-based authorization request processing system is used for processing of authorization requests. In one example, the cell-based authorization request processing system comprises a plurality of cells (e.g., separate authorization request processing devices) and one or more routing devices. In operation, a cell obtains (e.g., from a routing device) an authorization request including transaction information, with the authorization request being associated with one or more credentials. In some implementations, the cell adds, based on the transaction information, an authorization record to an authorization data structure associated with the one or more credentials. The cell adjusts, based on the transaction information, one or more sub-aggregate data structures associated with the one or more credentials. The cell may then provide change information to enable logical replication of the addition to the authorization data structure and the adjustment of the one or more sub-aggregate data structures on one or more cells.

In some implementations, the techniques and apparatuses described herein provide a scalable architecture that ensures low latency associated with authorization request processing, even during peak transaction periods. Additionally, the techniques and apparatuses described herein provide direct connections and deeper data integration that facilitates strengthening of fraud prevention capabilities. Further, the techniques and apparatuses described herein serve to avoid undesirable latency with respect to authorization request processing through the use of asynchronous logical replication among cells of a cell-based authorization request processing system. Notably, there can in some cases be some amount of "data replication lag" that can delay visibility of data addition or adjustments to other cells. To address this, the cell-based authorization request processing system can be configured such that authorization requests associated with the same account are either routed to the same cell (e.g., when stronger immediate consistency is desired), or to one of a group of cells within the same datacenter or region (e.g., when faster overall latency is desired). This authorization request routing ensures that authorization requests are processed according to the most up-to-date data, and would only be affected by the "data replication lag" during routing reconfiguration (e.g., when routing tables are changing, such as after a cell crashes or is taken down).

Further, the cell-based authorization request processing system provides a distributed data solution, which introduces the possibility of data consistency. For example, if one cell attempts to update or delete an authorization record at the same time as another cell, then some type of conflict resolution should occur (e.g., last write wins). This is not acceptable with respect to authorization request processing. To address this, the techniques and apparatuses described herein use de-structured sub-aggregates. Here, each cell "owns" the data events (e.g., addition of records, adjustment of values, or the like) that are initiated within that cell, with the associated additions or adjustments being written to a local database instance along with a cell identifier value, after which the additions or adjustments are replicated to other cells asynchronously. When reading data, a given cell combines the appropriate sub-aggregate records to determine a current state associated with a credential. This allows each cell to leverage traditional atomicity, consistency, isolation, and durability (ACID) guarantees for transactions operating against records owned by the cell, without a need for conflict resolution. Put another way, the techniques and apparatuses described herein enable ACID guarantees in a multi-region active/active environment in order to support provisioning of a running total associated with a credential, without a need to perform (expensive) query-time aggregations. Additional details are provided below.

Figure 1B:
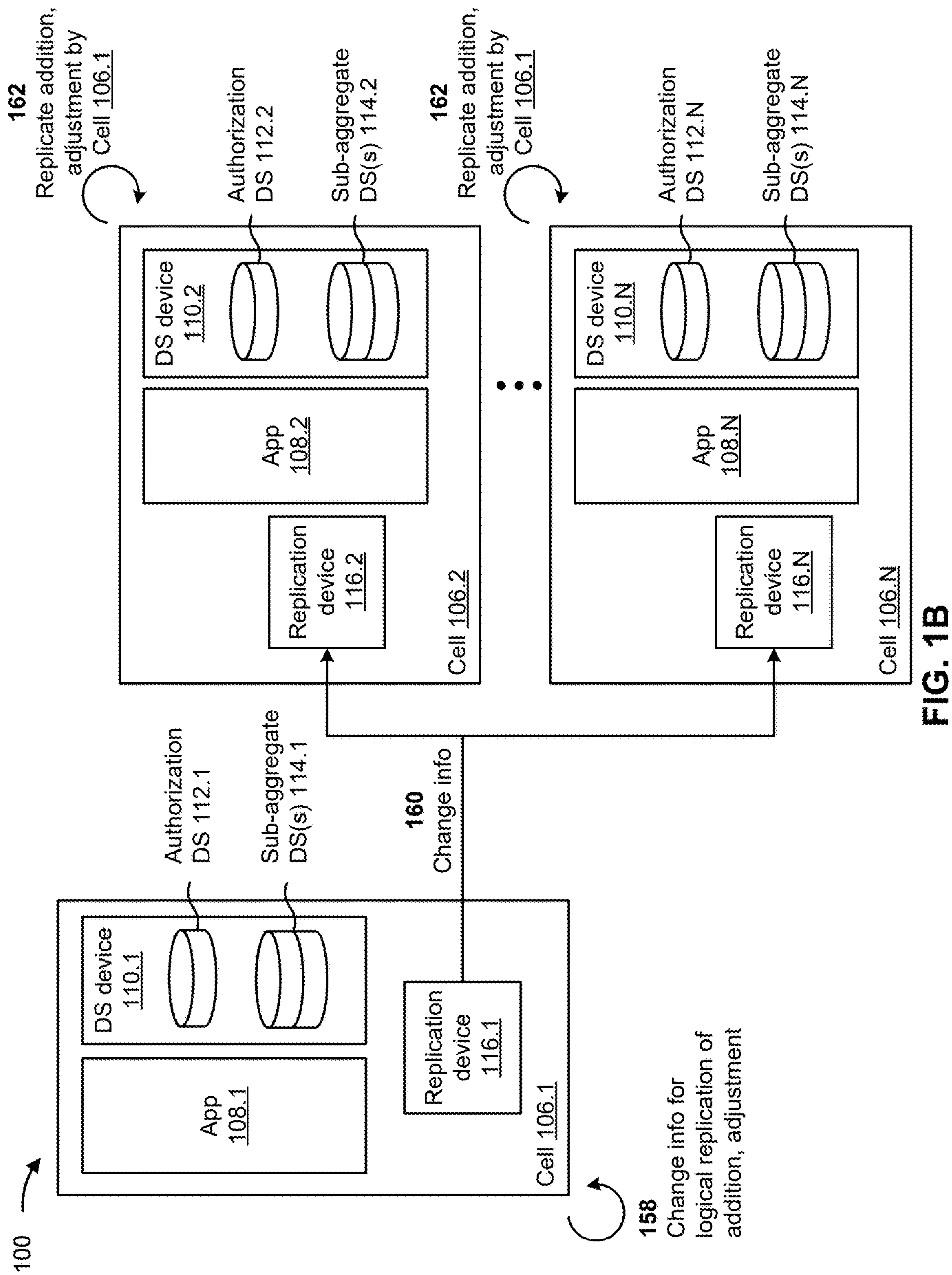

FIGS. 1A-1B are diagrams of an example 100 associated with logical replication of data associated with a credential in a cell-based authorization request processing system. As shown in FIGS. 1A-1B, example 100 includes a transaction terminal 102, a routing device 104, and a plurality of cells 106 (e.g., cell 106.1 through cell 106.N (N>1)) each comprising an associated application component 108 (e.g., app 108.1 through app 108.N), an associated data structure device 110 (e.g., DS device 110.1 through DS device 110.N) that stores an authorization data structure 112.1 and a sub-aggregate data structure 114, and an associated replication device 116 (e.g., replication device 116.1 through replication device 116.N). These devices are described in more detail in connection with FIGS. 2 and 3.

As shown at reference 150 in FIG. 1A, the transaction terminal 102 may provide, and the routing device 104 may receive, an authorization request including transaction information.

The transaction information includes information associated with a transaction for which authorization is requested by the authorization request. The transaction information may include, for example, a medium credential (e.g., a transaction card number), an account credential (e.g., an account number) associated with the medium credential, a value associated with the transaction (e.g., a purchase amount), or the like.

In some implementations, as noted above, the authorization request may include a medium credential, and the routing device 104 may identify an account credential associated with the medium credential. For example, the routing device 104 may store or have access to information that maps medium credentials to account credentials, and may identify an account credential associated with the medium credential based on this information.

As shown at reference 152, a cell 106.1 may obtain the authorization request. For example, the routing device 104 may provide, and the cell 106.1 may receive, the authorization request. In some implementations, the routing device 104 may select the cell 106.1 for processing the authorization request. For example, the routing device 104 may identify a pool of cells 106 that are associated with the account credential, with the pool of cells 106 including the cell 106.1. The routing device 104 may then select the cell 106.1 as a target cell 106 for processing of the authorization request. Thus, in some implementations, the cell 106.1 may obtain the authorization request based on an association of the cell 106.1 with one or more credentials. In this way, authorization requests associated with a given account credential may be routed to a particular set of cells 106 for processing in the cell-based authorization request processing system.

As shown at reference 154, the cell 106.1 (e.g., the app 108.1) may add, based on the transaction information, an authorization record to an authorization data structure 112.1 (e.g., an authorization table) associated with the one or more credentials. For example, the cell 106.1 (e.g., the app 108.1) may add an authorization record to the authorization data structure 112.1 stored on the data structure device 110.1. In some implementations, the authorization record may include information associated with the authorization request and/or the cell 106. For example, with respect to example 100, the authorization record may include an identifier associated with the authorization request (e.g., a universally unique identifier (UUID)), the account credential associated with the authorization request, the medium credential (e.g., a tokenized transaction card number) associated with the authorization request, timing information associated with the authorization request (e.g., a timestamp, a date, or the like), an identifier associated with the cell 106.1, or another type of information associated with the authorization request and/or the cell 106.1.

In some implementations, the authorization data structure 112.1 may be partitioned so as to enable efficient removal of authorization records from the authorization data structure 112.1. For example, the authorization data structure 112.1 may be partitioned based on timing information (e.g., date) so as to enable removal of expired or otherwise aged authorization records based on the timing information. In some implementations, such partitioning avoids negative performance impacts that would otherwise be caused by bulk deletions of authorization records, such as latency with respect to authorization requests received during bulk deletion.

As shown at reference 156, the cell 106.1 (e.g., the app 108.1) may adjust, based on the transaction information, one or more sub-aggregate data structures 114.1 associated with the one or more credentials. In some implementations, the adjustment of the one or more sub-aggregate data structures 114.1 comprises an adjustment to one or more aggregate values associated with the one or more credentials, with the adjustment being based on a value indicated in the transaction information. For example, the one or more sub-aggregate data structures 114.1 stored on the data structure device 110.1 may include a sub-aggregate data structure 114.1 associated with the medium credential (e.g., a sub-aggregate data structure 114.1 that stores information associated with the transaction card number). In this example, the cell 106.1 (e.g., the app 108.1) may adjust the sub-aggregate data structure 114.1 associated with the medium credential based on the transaction information. As a particular example, the cell 106.1 may retrieve, from the sub-aggregate data structure 114.1 associated with the medium credential, an aggregate value associated with the medium credential (e.g., a total purchase amount associated with the transaction card). The cell 106.1 may then adjust the aggregate value, stored in the sub-aggregate data structure associated with the medium credential, by adding a value (e.g., a desired purchase amount) indicated in the transaction information to the aggregate value (e.g., such that the total purchase amount is adjusted to include the desired purchase amount indicated in the authorization request).

As another example, the one or more sub-aggregate data structures 114.1 stored on the data structure device 110.1 may include a sub-aggregate data structure 114.1 associated with the account credential (e.g., a sub-aggregate data structure 114.1 that stores information associated with the account identifier). In this example, the cell 106.1 (e.g., the app 108.1) may adjust the sub-aggregate data structure 114.1 associated with the account credential based on the transaction information. As a particular example, the cell 106.1 may retrieve, from the sub-aggregate data structure 114.1 associated with the account credential, an aggregate value associated with the account credential (e.g., a total purchase amount associated with the account identifier). The cell 106.1 may then adjust the aggregate value, stored in the sub-aggregate data structure associated with the account credential, by adding a value (e.g., a desired purchase amount) indicated in the transaction information to the aggregate value (e.g., such that the total purchase amount associated with the account credential is adjusted to include the desired purchase amount indicated in the authorization request).

The operations described in connection with reference numbers 154 and 156 are portions of a single interaction (e.g., parts of an "atomic" interactions). In other words, operations described in connection with reference number 154 are not performed without also performing operations described in connection with reference number 156 (and, similarly, operations described in connection with reference number 156 are not performed without also performing operations described in connection with reference number 154). For example, the operations described in connection with reference numbers 154 and 156 may be performed simultaneously (overlapping in time) or at least concurrently (at least partially overlapping in time).

Notably, with respect to the authorization records maintained in the authorization data structure 112.1 and the aggregate values maintained in the sub-aggregate data structures 114.1 in the examples above, the authorization data structure 112.1 and the sub-aggregate data structures 114.1 (e.g., the sub-aggregate data structure 114.1 associated with the medium credential and the sub-aggregate data structure 114.1 associated with the account credential) include data that has been (asynchronously) replicated from other cells 106. That is, data from authorization data structures 112 and sub-aggregate data structures 114 associated with other cells 106 (e.g., cells 106.2 through 106.N) can be replicated to the authorization data structure 112.1 and the sub-aggregate data structures 114.1 in the manner described herein such that data consistency is achieved across all cells 106 associated with the account credential.

As shown at reference 158 in FIG. 1B, the cell 106.1 may provide change information to enable logical replication of the addition to the authorization data structure 112.1 and the adjustment of the one or more sub-aggregate data structures 114.1 on one or more cells 106. For example, the cell 106 may determine (e.g., using a logical decoding technique) change information that captures the changes performed by the cell 106.1 (e.g., information from which the addition to the authorization data structure 112.1 and the adjustment(s) of the sub-aggregate data structure(s) 114.1 can be determined). The cell 106.1 may then provide the change information to the replication device 116.1.

As shown by reference 160, the replication device 116.1 may provide (e.g., publish) the change information such that the change information is received at replication devices 116 (e.g., replication devices 116.2 through 116.N) of other cells 106 (e.g., cells 106.2 through 106.N). Therefore, the replication device 116.1 may be referred to as a "publisher," and the replication devices 116.2 through 116.N may be referred to as "subscribers." In other examples, the replication devices 116.2 through 116.N may also function as "publishers," and the replication device 116.1 may function as a "subscriber." Therefore, in general, a cell may function as both a publisher and a subscriber, depending on which cell is handling a request. The cell handling the request may publish the same change information so that other subscribed cells may receive the change information and update their respective states accordingly.

As shown by reference 162, upon receiving the change information, the other cells 106 may replicate the addition to the authorization data structure 112.1 and the adjustment(s) to the sub-aggregate data structure sub-aggregate data structure(s) 114.1 on their respective authorization data structures 112 (e.g., authorization data structures 112.2 through 112.N) and sub-aggregate data structures 114 (e.g., sub-aggregate data structures 114.2 through 114.N).

In some implementations, the techniques and apparatuses described herein for logical replication of data in a cell-based authorization request system provide an active/active solution for continuous availability with respect to authorization request processing. Further, the techniques and apparatuses described herein enable handling of bulk authorization events by avoiding (expensive) query-time aggregations, enable handling of simultaneous authorizations through increasing immediate consistency, and enable handling of burst authorization events and record expiration through providing predictable performance. Further, the techniques and apparatuses described herein provide data consistency within a given cell 106 and across a plurality of cells 106, with ACID actions being localized to a given cell 106 and then replicated to other cells 106.

As indicated above, FIGS. 1A-1B are provided as an example. Other examples may differ from what is described with regard to FIGS. 1A-1B.

Figure 2:
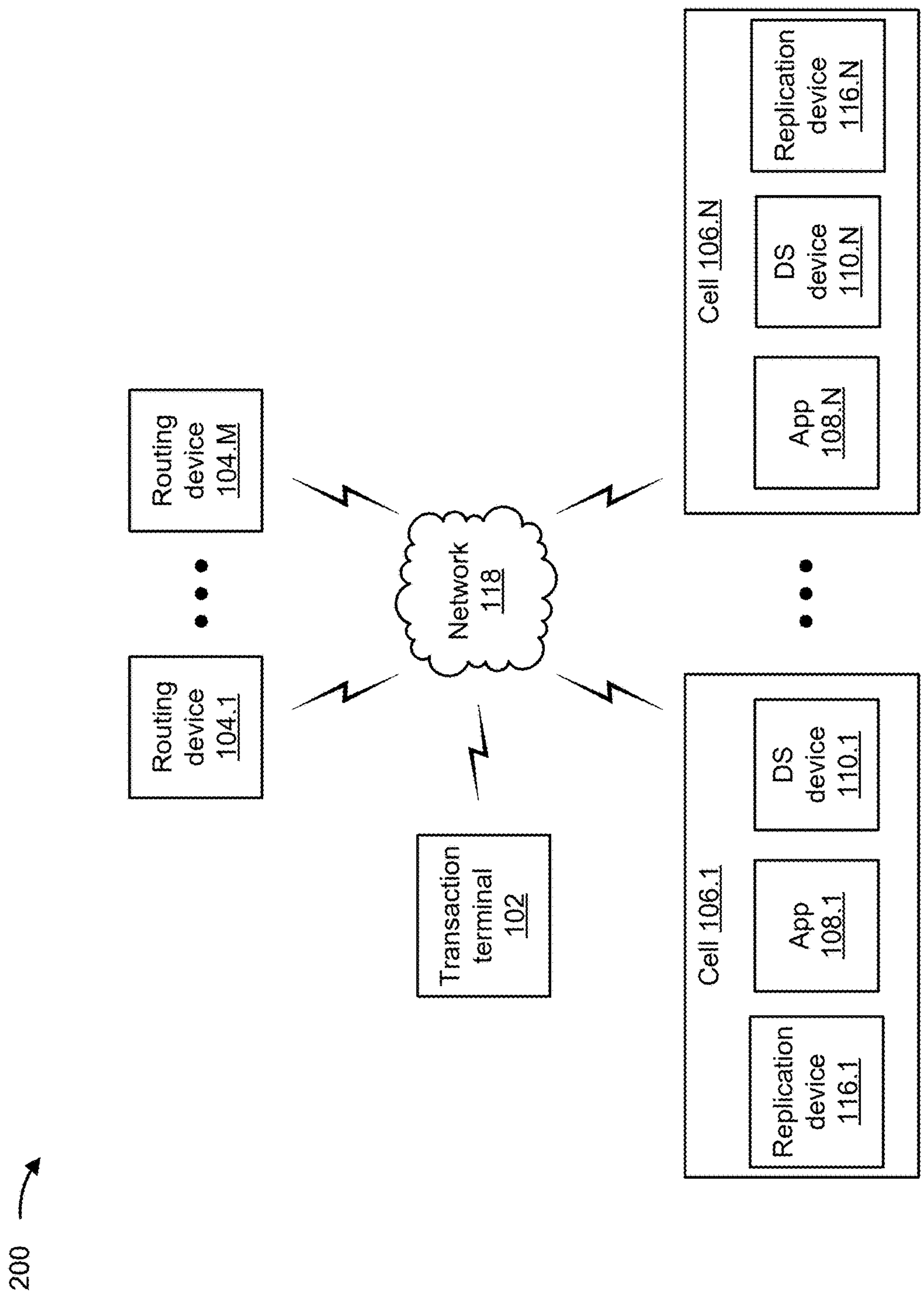
FIG. 2 is a diagram of an example environment in which devices, systems, and/or methods described herein may be implemented, in accordance with some embodiments of the present disclosure.

FIG. 2 is a diagram of an example environment 200 in which devices, systems, and/or methods described herein may be implemented. As shown in FIG. 2, environment 200 may include a transaction terminal 102; a routing device 104; a plurality of cells 106 (e.g., cell 106.1 through cell 106.N (N>1)) each comprising an associated application component 108, a data structure device 110, and a replication device 116; and a network 118. Devices of environment 200 may interconnect via wired connections, wireless connections, or a combination of wired and wireless connections.

The transaction terminal 102 may include one or more devices capable of facilitating an electronic transaction. For example, the transaction terminal 102 may include a point-of-sale (POS) terminal, a payment terminal (e.g., a credit card terminal, a contactless payment terminal, a mobile credit card reader, or a chip reader), and/or an automated teller machine (ATM). The transaction terminal 102 may include one or more input components and/or one or more output components to facilitate obtaining data (e.g., an authorization request, transaction information, or the like) from a transaction device (e.g., a transaction card, a mobile device executing a payment application, or the like) and/or to facilitate interaction with and/or authorization from an owner or accountholder of the transaction device. Example input components of the transaction terminal 102 include a number keypad, a touchscreen, a magnetic stripe reader, a chip reader, and/or a radio frequency (RF) signal reader (e.g., a near-field communication (NFC) reader). Example output devices of transaction terminal 102 include a display and/or a speaker.

The routing device 104 may include one or more devices capable of receiving, processing, storing, routing, and/or providing traffic (e.g., an authorization request) in a manner described herein. For example, the routing device 104 may include a router, such as a label switching router (LSR), a label edge router (LER), an ingress router, an egress router, a provider router (e.g., a provider edge router or a provider core router), a virtual router, or another type of router. Additionally, or alternatively, the routing device 104 may include a gateway, a switch, a firewall, a hub, a bridge, a reverse proxy, a server (e.g., a proxy server, a cloud server, or a data center server), a load balancer, and/or a similar device. In some implementations, the routing device 104 may be a physical device implemented within a housing, such as a chassis. In some implementations, the routing device 104 may be a virtual device implemented by one or more computing devices of a cloud computing environment or a data center. In some implementations, a group of routing devices 104 may be a group of data center nodes that are used to route traffic flow through a network.

A cell 106 may include one or more devices capable of receiving, generating, storing, processing, and/or providing information associated with an authorization request and/or performing processing of the authorization request, as described herein. In some implementations, a given cell 106 includes an application component (app) 108, a data structure (DS) device 110, and a replication device 116. The application component 108 may include one or more one or more devices capable of receiving, generating, storing, processing, and/or providing information (e.g., data) associated with processing an authorization request in a cell-based authorization request processing system. The application component 108 may include a communication device and/or a computing device. For example, the application component 108 may include a server, such as an application server, a client server, a web server, a database server, a host server, a proxy server, a virtual server (e.g., executing on computing hardware), or a server in a cloud computing system. In some implementations, the application component 108 may include computing hardware used in a cloud computing environment. The data structure device 110 may include one or more devices capable of receiving, generating, storing, processing, and/or providing information (e.g., data) associated with authorization request routing in a cell-based authorization request processing system, as described elsewhere herein. The data structure device 110 may include a communication device and/or a computing device. For example, the data structure device 110 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the data structure device 110 may include one or more databases. The replication device 116 may include one or more devices capable of receiving, generating, storing, processing, and/or providing information related to logical replication of data associated with a credential in a cell-based authorization request processing system, as described elsewhere herein. The replication device 116 may include a communication device and/or a computing device. For example, the replication device 116 may include a server, such as an application server, a client server, a web server, a database server, a host server, a proxy server, a virtual server (e.g., executing on computing hardware), or a server in a cloud computing system. In some implementations, the replication device 116 may include computing hardware used in a cloud computing environment.

The network 118 may include one or more wired and/or wireless networks. For example, the network 118 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 118 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
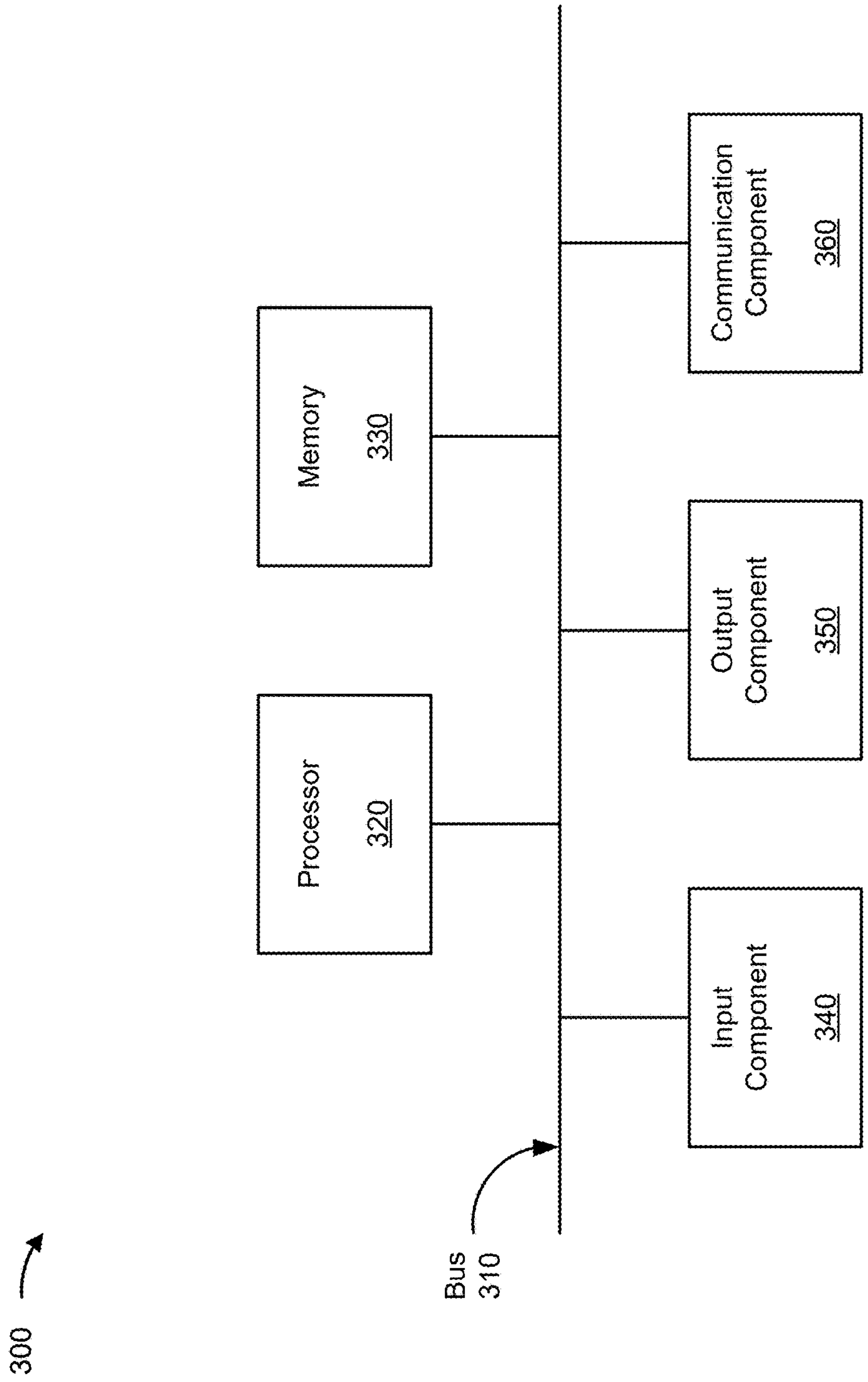
FIG. 3 is a diagram of example components of a device associated with logical replication of data associated with credential in a cell-based authorization request processing system, in accordance with some embodiments of the present disclosure.

FIG. 3 is a diagram of example components of a device 300 associated with logical replication of data associated with credential in a cell-based authorization request processing system. The device 300 may correspond to a transaction terminal 102, a routing device 104, a cell 106, an application component 108, a data structure device 110, and/or a replication device 116. In some implementations, a transaction terminal 102, a routing device 104, a cell 106, an application component 108, a data structure device 110, and/or a replication device 116 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
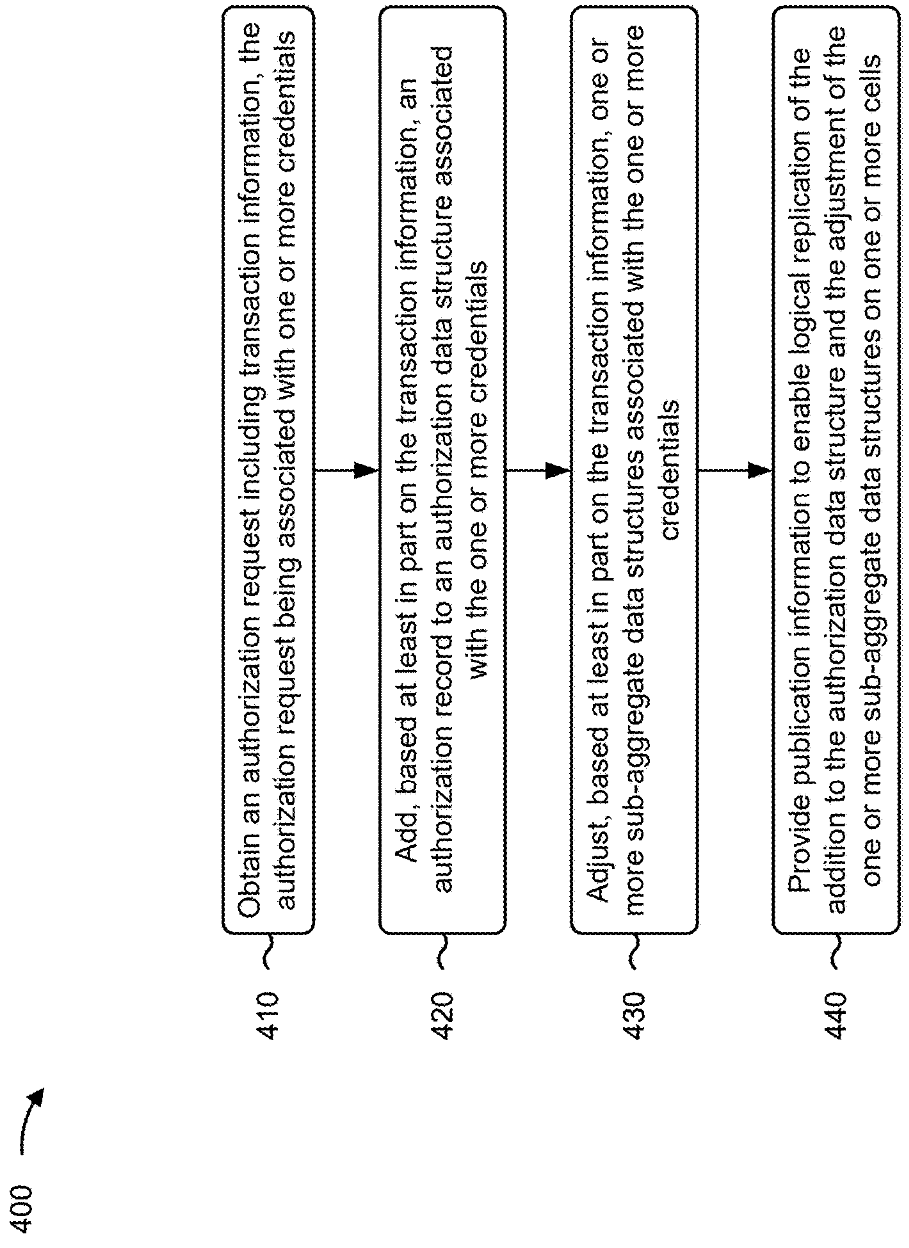
FIG. 4 is a flowchart of an example process associated with logical replication of data associated with a credential in a cell-based authorization request processing system, in accordance with some embodiments of the present disclosure.

FIG. 4 is a flowchart of an example process 400 associated with logical replication of data associated with a credential in a cell-based authorization request processing system. In some implementations, one or more process blocks of FIG. 4 may be performed by the cell 106. In some implementations, one or more process blocks of FIG. 4 may be performed by another device or a group of devices separate from or including the cell 106, such as the transaction terminal 102 and/or the routing device 104. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining an authorization request including transaction information, the authorization request being associated with one or more credentials (block 410). For example, the cell 106 (e.g., using processor 320 and/or memory 330) may obtain an authorization request including transaction information, the authorization request being associated with one or more credentials, as described above in connection with reference 152 of FIG. 1A. As an example, the cell 106.1 may obtain an authorization request including transaction information that comprises a desired purchase amount.

As further shown in FIG. 4, process 400 may include adding, based on the transaction information, an authorization record to an authorization data structure associated with the one or more credentials (block 420). For example, the cell 106 (e.g., using processor 320 and/or memory 330) may add, based on the transaction information, an authorization record to an authorization data structure associated with the one or more credentials, as described above in connection with reference 154 of FIG. 1A. As an example, the cell 106.1 (e.g., the app 108.1) may add an authorization record to an authorization data structure 112.1 (e.g., stored on a data structure device 110.1 of the cell 106.1) associated with an account credential with which the authorization request is associated.

As further shown in FIG. 4, process 400 may include adjusting, based on the transaction information, one or more sub-aggregate data structures associated with the one or more credentials (block 430). For example, the cell 106 (e.g., using processor 320 and/or memory 330) may adjust, based on the transaction information, one or more sub-aggregate data structures associated with the one or more credentials, as described above in connection with reference 156 of FIG. 1A. As an example, the cell 106.1 (e.g., the app 108.1) may adjust a total aggregate value stored in one or more sub-aggregate data structures 114.1 (e.g., stored on the data structure device 110.1) based on the desired purchase amount indicated in the transaction information.

The operations described in connection with blocks 420 and 430 may represent portions of a single interaction. For example, the operations described in connection with blocks 420 and 430 may be performed simultaneously (overlapping in time) or at least concurrently (at least partially overlapping in time.

As further shown in FIG. 4, process 400 may include providing change information to enable logical replication of the addition to the authorization data structure and the adjustment of the one or more sub-aggregate data structures on one or more cells (block 440). For example, the cell 106 (e.g., using processor 320 and/or memory 330) may provide change information to enable logical replication of the addition to the authorization data structure and the adjustment of the one or more sub-aggregate data structures on one or more cells, as described above in connection with reference 158 of FIG. 1B. As an example, the cell 106.1 may provide change information, associated with the addition to the authorization data structure 112.1 and the adjustment to the one or more sub-aggregate data structures 114.1, to enable logical replication of the addition and the change on other cells 106 associated with the account credential.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles “a” and “an” are intended to include one or more items, and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A device for logical replication of data associated with a credential in a cell-based authorization request processing system, the device comprising:

one or more memories; and one or more processors, communicatively coupled to the one or more memories, configured to:

obtain an authorization request including transaction information, the authorization request being associated with one or more credentials;

add, based on the transaction information, an authorization record to an authorization data structure associated with the one or more credentials;

adjust, based on the transaction information, one or more sub-aggregate data structures associated with the one or more credentials; and provide change information to enable logical replication of the addition to the authorization data structure and the adjustment of the one or more sub-aggregate data structures on one or more cells.

2. The device of claim 1, wherein the adjustment of the one or more sub-aggregate data structures comprises an adjustment to one or more aggregate values associated with the one or more credentials, wherein the adjustment to the one or more aggregate values is based on a value indicated in the transaction information.

3. The device of claim 1, wherein the one or more processors, to adjust the one or more sub-aggregate data structures, are configured to:

retrieve one or more aggregate values, associated with the one or more credentials, from the one or more sub-aggregate data structures, and adjust the one or more aggregate values based on a value included in the transaction information.

4. The device of claim 1, wherein the one or more credentials include a medium credential and the one or more sub-aggregate data structures include a sub-aggregate data structure associated with the medium credential.

5. The device of claim 1, wherein the one or more credentials include an account credential and the one or more sub-aggregate data structures include a sub-aggregate data structure associated with the account credential, wherein the account credential is associated with one or more medium credentials.

6. The device of claim 1, wherein the authorization data structure is partitioned based on timing information associated with authorization requests.

7. The device of claim 1, wherein the authorization request is obtained based on an association of the device with the one or more credentials.

8. A method for logical replication of data associated with a credential in a cell-based authorization request processing system, comprising:

obtaining, by a device, a request including transaction information, the request being associated with one or more credentials;

adding, by the device, based on the transaction information, a record to an authorization data structure associated with the one or more credentials;

adjusting, by the device, based on the transaction information, one or more sub-aggregate data structures associated with the one or more credentials; and providing, by the device, change information to enable logical replication of the addition to the data structure and the adjustment of the one or more sub-aggregate data structures on one or more cells.

9. The method of claim 8, wherein the adjustment of the one or more sub-aggregate data structures comprises an adjustment to one or more aggregate values associated with the one or more credentials, wherein the adjustment to the one or more aggregate values is based on a value indicated in the transaction information.

10. The method of claim 8, further comprising:

retrieving one or more aggregate values, associated with the one or more credentials, from the one or more sub-aggregate data structures, and adjusting the one or more aggregate values based on a value included in the transaction information.

11. The method of claim 8, wherein the one or more credentials include a medium credential and the one or more sub-aggregate data structures include a sub-aggregate data structure associated with the medium credential.

12. The method of claim 8, wherein the one or more credentials include an account credential and the one or more sub-aggregate data structures include a sub-aggregate data structure associated with the account credential, wherein the account credential is associated with one or more medium credentials.

13. The method of claim 8, wherein the authorization data structure is partitioned based on timing information associated with authorization requests.

14. The method of claim 8, wherein the request is obtained based on an association of the device with the one or more credentials.

15. A non-transitory computer-readable medium storing a set of instructions, the set of instructions comprising:

one or more instructions that, when executed by one or more processors of a device, cause the device to:

obtain an authorization request including transaction information, the authorization request being associated with one or more credentials;

update, based on the transaction information, an authorization record to an authorization data structure associated with the one or more credentials;

modify, based on the transaction information, one or more sub-aggregate data structures associated with the one or more credentials; and cause logical replication of the update to the authorization data structure and the modification of the one or more sub-aggregate data structures with respect to one or more cells.

16. The non-transitory computer-readable medium of claim 15, wherein the modification of the one or more sub-aggregate data structures comprises a modification to one or more aggregate values associated with the one or more credentials, wherein the modification to the one or more aggregate values is based on a value indicated in the transaction information.

17. The non-transitory computer-readable medium of claim 15, wherein the one or more credentials include a medium credential and the one or more sub-aggregate data structures include a sub-aggregate data structure associated with the medium credential.

18. The non-transitory computer-readable medium of claim 15, wherein the one or more credentials include an account credential and the one or more sub-aggregate data structures include a sub-aggregate data structure associated with the account credential, wherein the account credential is associated with one or more medium credentials.

19. The non-transitory computer-readable medium of claim 15, wherein the authorization data structure is partitioned based on timing information associated with authorization requests.

20. The non-transitory computer-readable medium of claim 15, wherein the authorization request is obtained based on an association of the device with the one or more credentials.

* * * * *